(12) United States Patent
Sparling

(10) Patent No.: US 9,233,628 B2
(45) Date of Patent: Jan. 12, 2016

(54) CHILD SEAT WITH HARNESS STRAP PAD

(71) Applicant: Chad Allen Sparling, Ortonville, MI (US)

(72) Inventor: Chad Allen Sparling, Ortonville, MI (US)

(73) Assignee: RECARO CHILD SAFETY LLC, Auburn Hills, MI (US)

( * ) Notice: Subject to any disclaimer, the term of this patent is extended or adjusted under 35 U.S.C. 154(b) by 0 days.

(21) Appl. No.: 14/297,856

(22) Filed: Jun. 6, 2014

(65) Prior Publication Data

US 2015/0035331 A1 Feb. 5, 2015

Related U.S. Application Data

(60) Provisional application No. 61/860,021, filed on Jul. 30, 2013.

(51) Int. Cl.
 *A47C 31/11* (2006.01)
 *A47D 1/10* (2006.01)
 *B60N 2/28* (2006.01)

(52) U.S. Cl.
 CPC ............ *B60N 2/2812* (2013.01); *B60N 2/2851* (2013.01); *B60N 2002/2815* (2013.01); *B60N 2002/2818* (2013.01)

(58) Field of Classification Search
 CPC .............. B60N 2/2812; B60N 2/2851; B60N 2002/2815; B60N 2002/2818
 USPC ................................... 297/219.12, 250.1, 484
 See application file for complete search history.

(56) References Cited

U.S. PATENT DOCUMENTS

| | | | | |
|---|---|---|---|---|
| 5,108,152 A * | 4/1992 | Reilly et al. | ................... | 297/484 |
| 5,366,271 A * | 11/1994 | Johnston et al. | ........... | 297/250.1 |
| 5,580,133 A | 12/1996 | Knox et al. | | |
| 6,457,774 B2 | 10/2002 | Baloga | | |
| 6,471,298 B2 | 10/2002 | Carine et al. | | |
| 7,234,771 B2 * | 6/2007 | Nakhla | ...................... | 297/250.1 |
| 7,537,284 B1 * | 5/2009 | Antorcha | ................. | 297/219.12 |
| 8,182,033 B2 | 5/2012 | Hei et al. | | |
| 8,240,772 B2 * | 8/2012 | Kawata et al. | ........... | 297/219.12 |
| 8,408,656 B2 | 4/2013 | Carpenter | | |
| 8,419,128 B1 * | 4/2013 | Leach | ....................... | 297/219.12 |
| 2006/0001299 A1 * | 1/2006 | Sallus | ....................... | 297/219.12 |
| 2006/0006710 A1 * | 1/2006 | Sallus | ...................... | 297/219.12 |
| 2008/0073954 A1 * | 3/2008 | Paulson | ................... | 297/219.12 |
| 2008/0079297 A1 * | 4/2008 | Braxton Perry | ......... | 297/219.12 |
| 2008/0265653 A1 | 10/2008 | Wetter | | |
| 2009/0167065 A1 * | 7/2009 | Kespohl | ..................... | 297/250.1 |
| 2010/0060052 A1 * | 3/2010 | Hutchinson et al. | ....... | 297/250.1 |
| 2010/0308631 A1 | 12/2010 | Biaud | | |
| 2011/0133532 A1 * | 6/2011 | Zhao | .......................... | 297/250.1 |
| 2012/0326476 A1 * | 12/2012 | Runk et al. | ................. | 297/250.1 |
| 2013/0015691 A1 * | 1/2013 | Feng et al. | ................. | 297/250.1 |
| 2013/0161986 A1 | 6/2013 | Kopp | | |
| 2013/0175835 A1 * | 7/2013 | Fujita et al. | .............. | 297/219.12 |
| 2014/0252814 A1 * | 9/2014 | Cohen et al. | .............. | 297/250.1 |

* cited by examiner

*Primary Examiner* — Rodney B White
(74) *Attorney, Agent, or Firm* — Thompson Hine LLP

(57) ABSTRACT

A seat assembly is disclosed. The seat assembly includes a shell portion, a pair of harness straps, a seat cover, and a harness pad. The shell portion has an outer surface. The pair of harness straps have an upper portion. The seat cover has an inner surface. The harness pad includes a first portion and a pair of elongated pads. The first portion may be positioned between the outer surface of the shell and the inner surface of the seat cover. The pair of elongated pads may be connected to the head portion. The elongated pads may each be configured to slidably receive the upper portion of a respective one of the harness straps.

15 Claims, 8 Drawing Sheets

CHILD SEAT WITH HARNESS STRAP PAD

RELATED APPLICATIONS

This application claims the benefit of U.S. Provisional Application No. 61/860,021, filed on Jul. 30, 2013.

TECHNICAL FIELD

The disclosure relates generally to a child seat having harness straps and, more particularly, to a pad for use with harness straps in a child seat.

BACKGROUND

Child seats typically include two harness straps and a crotch strap, which may be used to secure a child to the seat. Each of the harness straps are provided with a slidable tongue, and the crotch strap is provided with a buckle. The tongues of the harness straps may both be selectively engaged by a latching mechanism located in the buckle of the crotch strap to secure the child to the seat. The harness straps include corresponding upper ends and lower ends, where the upper ends of the harness straps may be positioned over the arms and shoulders of the child, and the lower ends of the harness straps may be anchored to a seat pan. When a child is secured to the seat, the upper ends of the harness straps may be seated against the child's shoulders. Sometimes the edges of the harness straps press or bear against the child's shoulders, which may cause discomfort to the child.

Some child seats include two tubular cushions or pads that each receive the upper end of one of the harness straps. The pads may be seated against the child's shoulders, and are used to generally prevent the edges of the upper ends of the harness straps from bearing down against the child's skin. However, sometimes the pads may slide downwardly along the harness straps, and migrate to the lower ends of the harness straps. Thus, there exists a need for a child seat having improved pads for the harness straps.

SUMMARY

In one aspect, a seat assembly is disclosed. The seat assembly may include a shell portion, a pair of harness straps, a seat cover, and a harness pad. The shell portion may have an outer surface. The pair of harness straps may have an upper portion. The seat cover may have an inner surface. The harness pad includes a first portion and a pair of elongated pads. The first portion may be positioned between the outer surface of the shell and the inner surface of the seat cover. The pair of elongated pads may be connected to the head portion. The elongated pads may each be configured to slidably receive the upper portion of a respective one of the harness straps.

In another aspect, a seat assembly is disclosed. The seat assembly includes a shell portion, a headrest, a pair of harness straps, a seat cover, and a harness pad. The shell portion may have an outer surface. The headrest may be part of the shell portion. The pair of harness straps may have an upper portion. The seat cover may have an inner surface and a pair of slits. Each harness strap may pass through a respective one of the slits in the seat cover. The harness pad may have a back side. The harness pad may include a first portion, a back pocket, and a pair of elongated pads. The first portion may be positioned between the outer surface of the shell portion and the inner surface of the seat cover. The back pocket may be located along the back side of the harness pad. The back pocket may receive a portion of the headrest. The pair of elongated pads may be connected to the head portion and passing through a respective one of the slits in the seat cover. The elongated pads may each include slotted portions configured to slidingly receive the upper portion of a respective one the harness straps.

In yet another aspect, a method of securing a child to a seat assembly is disclosed. The method includes placing a child in a seat. The seat may include a seat cover, a shell portion, and a harness pad. The harness pad may have a first portion positioned between the shell and the seat cover and a pair of elongated pads connected to the first portion. The method may include placing a pair of harness straps over the arms and shoulders of the child. The elongated pads may each be configured to slidably receive an upper portion of a respective one of the harness straps. The method may also include engaging a first portion of a chest clip with a second portion of the chest clip. The first portion and the second portion of the chest clip may each be slidable along a respective one of the harness straps. The method may further include sliding the chest clip along the harness straps. Finally, the method may include urging the elongated pads upwardly and into a pair of slits defined by the seat cover to expose the upper portions of the harness straps.

Other objects and advantages of the disclosed method and system will be apparent from the following description, the accompanying drawings and the appended claims.

DETAILED DESCRIPTION

Figure 1:
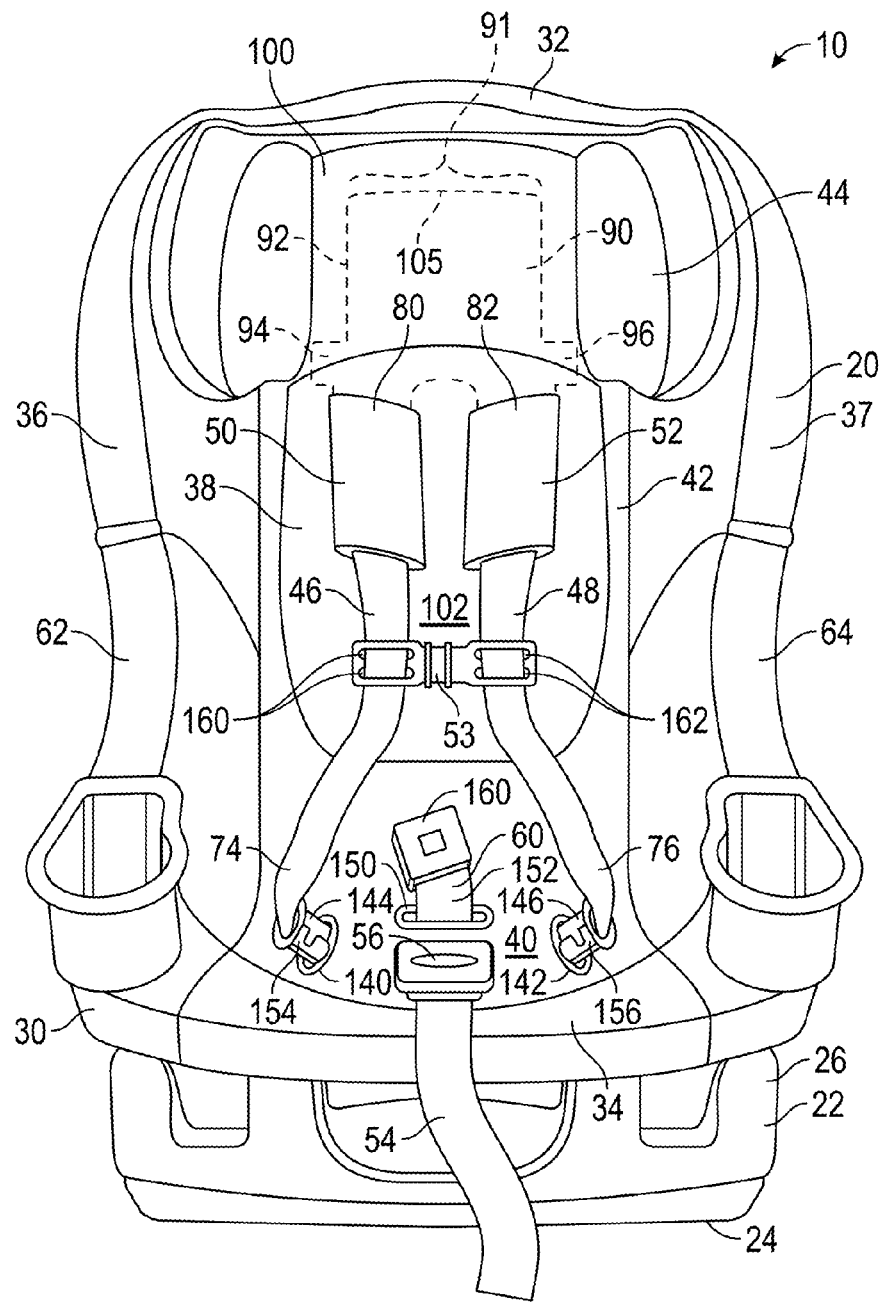
FIG. 1 is a front view of the disclosed child seat assembly.

As shown in FIG. 1, the disclosed child seat assembly, generally designated 10, may include a seat 20 and a base 22. The base 22 may include a lower surface 24 and an upper portion 26. The base 22 may be configured to be installed on a vehicle seat (not illustrated), where the lower surface 24 of the base 22 rests against the vehicle seat. The upper portion 26 of the base 22 may selectively receive a bottom portion 30 of the seat 20. Although the seat 20 is illustrated as being received by the base 22, it is to be understood that the base 22 may be omitted in one embodiment. The seat 20 may be any type of child seat configured to secure a toddler or an infant such as, for example, an infant seat, a convertible seat, or a combination seat.

The seat 20 may have a head end 32, a foot end 34, two sides 36, 37, a back support 38, and a seat pan 40. The two sides 36, 37 of the seat 20 may be generally parallel with one another and extend between the head end 32 and the foot end 34. The seat 20 may also include a cover 42, a headrest 44, two harness straps 46, 48, two elongated pads 50, 52, a chest clip 53, an adjuster strap 54, a web adjuster 56, a crotch strap 60, and two arm rests 62, 64. The headrest 44 may be located at the head end 32 of the seat 20. The armrest 62 may be located along the side 36 of the seat 20, and the armrest 64 may be located along the side 37 of the seat 20. The crotch strap 60 may be located on the seat pan 40 of the seat 20.

Figure 2:
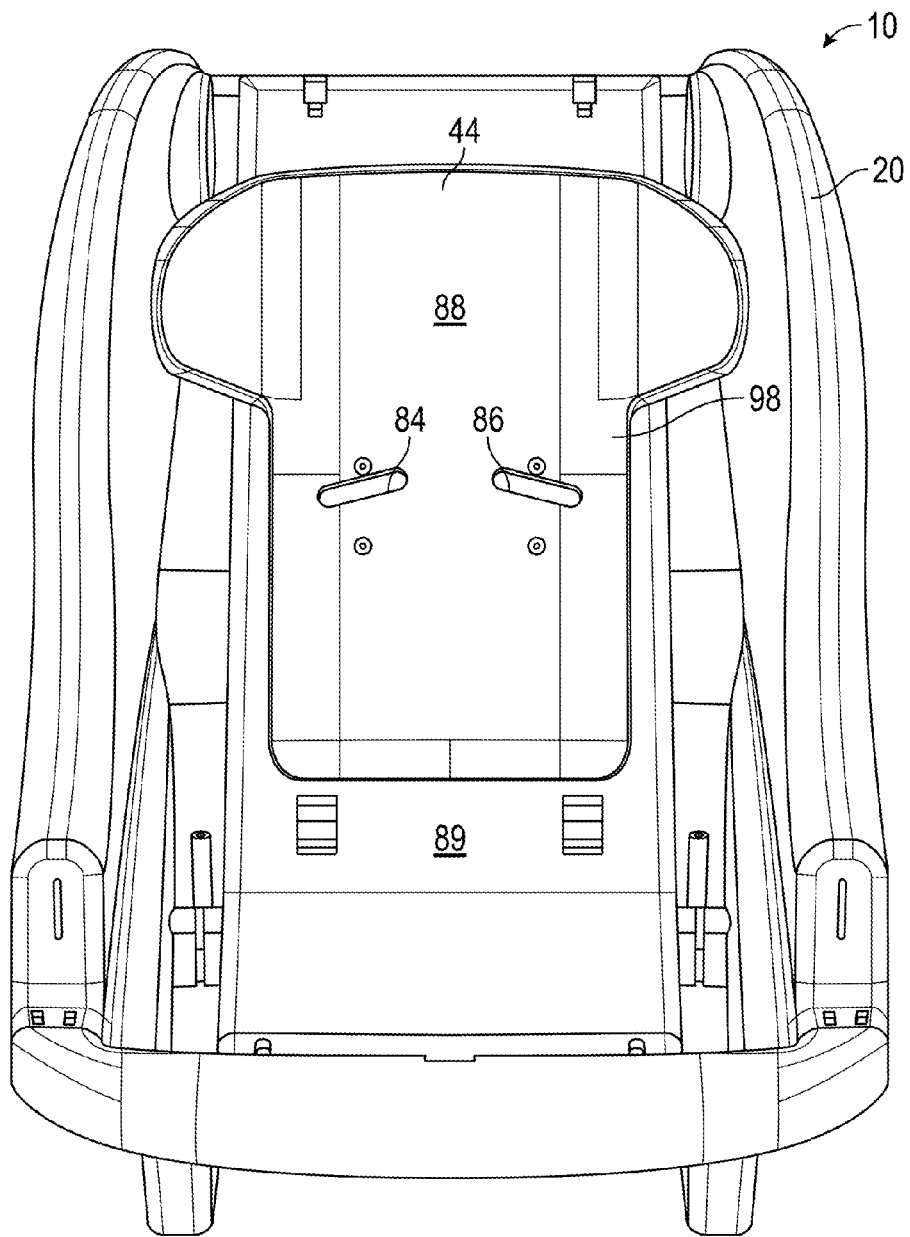
FIG. 2 is a front view of the seat shown in FIG. 1, where a seat cover is removed.

The harness straps 46, 48 may include corresponding upper portions (not visible in FIG. 1) and corresponding lower portions 74, 76. The upper portions of the harness straps 46, 48 may be received by slots 132, 134 (shown in FIG. 4) in the elongated pads 50, 52. The slots 132, 134 of the elongated pads 50, 52 are discussed in greater detail below. The upper portions of the harness straps 46, 48 may each pass through respective slits 80, 82 located in the seat cover 42 on the back support 38. Referring to FIG. 2, the cover 42 of the seat 20 has been removed, thereby revealing a shell 88 of the headrest 44 and a shell 89 of the seat 20. The shell 88 of the headrest 44 may have two openings 84, 86 that correspond to one the slits 80, 82 in the seat cover 42 (shown in FIG. 1). Referring to FIGS. 1-2, the upper portions of the harness straps 46, 48 may also pass through the respective openings 84, 86 located in the headrest 44.

Turning back to FIG. 1, the elongated pads 50, 52 may be part of a cushion or pad 90. A portion 91 of the pad 90, which is shown in phantom line, may be located underneath the seat cover 42. Specifically, the portion 91 of the pad 90 may be located between an inner surface of the seat cover 42 (the inner surface of the seat cover 42 is not visible in the Figures) and an outer surface 98 of the shell 88 of the headrest 44 (shown in FIG. 2). The pad 90 may be a cushion filled with a generally compressible such as, for example, foam or stuffing. The pad 90 may comprise the two elongated pads 50, 52, a head portion 92, and two tabs 94, 96. The head portion 92 and the two tabs 94, 96 may be located between the inner surface of the seat cover 42 and an outer surface 98 of the shell 88 of the headrest 44 (shown in FIG. 2). The head portion 92 may be positioned along an upper portion 100 of the headrest 44, and may be used to cushion a child's head. The two elongated pads 50, 52 may pass through the two slits 80, 82 located in the seat cover 42, and may be positioned along an exterior surface 102 of the seat cover 42.

Figure 3:
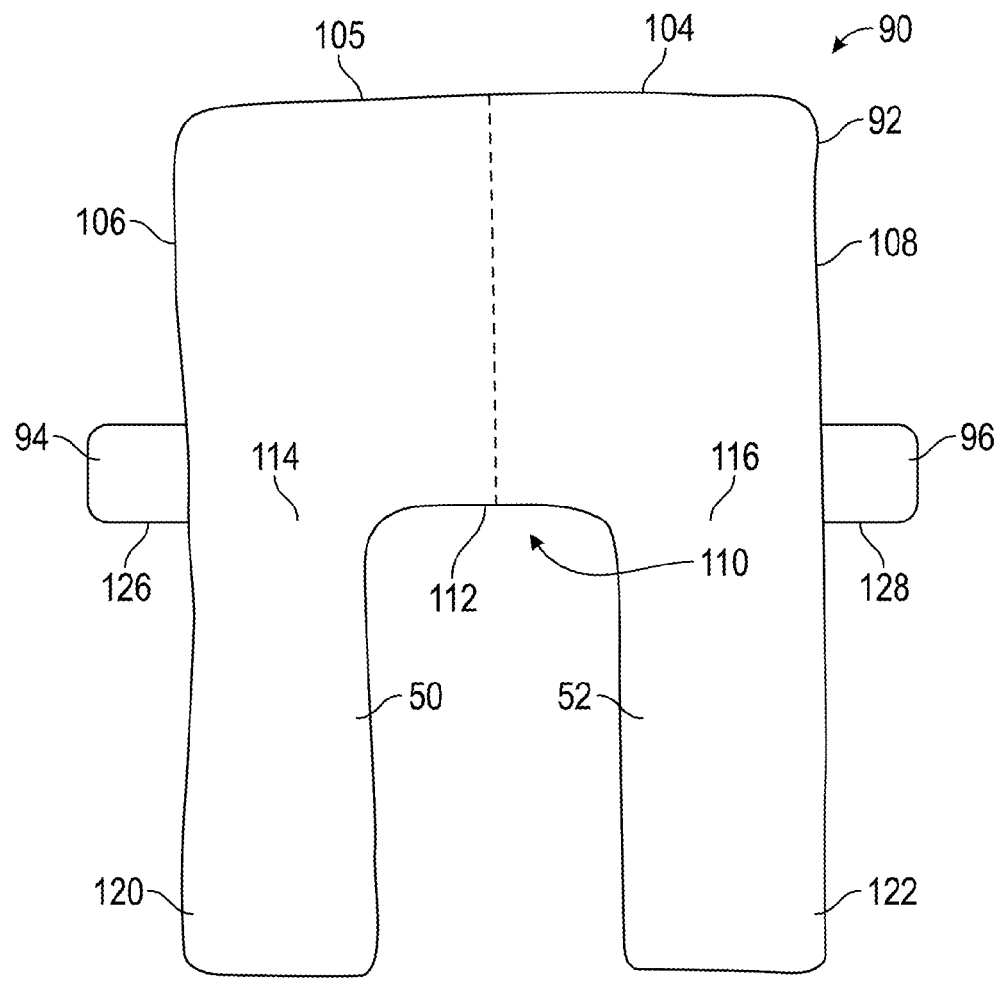
FIG. 3 is a front detail of a pad shown in FIG. 1.

Referring to FIGS. 1 and 3, the pad 90 may include an outer periphery 104, an upper surface 105, and two sides 106, 108. The outer periphery 104 of the pad 90 defines a generally U-shaped aperture 110 located between the two elongated pads 50, 52. The outer periphery 104 of the pad 90 may also define an abutment surface 112 located between the two elongated pads 50, 52. When the pad 90 is installed on the seat 20, the side 106 of the pad 90 may be positioned adjacent the side 36 of the seat 20, and the side 108 of the pad 90 may be positioned adjacent the side 37 of the seat 20. The two tabs 94, 96 may be located along the outer periphery 104 of the pad 90, where the tab 94 may be positioned on the side 106 of the pad 90, and the tab 96 may be positioned on the side 108 of the pad 90.

The abutment surface 112 of the pad 90 may generally prevent the elongated pads 50, 52 from sliding down the harness straps 46, 48 towards the seat pan 40, thereby exposing the upper portions of the harness straps 46, 48. Specifically, a user may pull the two elongated pads 50, 52 through the slits 80, 82 in the seat cover 42 until the abutment surface 112 of the pad 90 engages or abuts against the inner surface of the seat cover 42. Once the abutment surface 112 of the pad 90 abuts against the inner surface of the seat cover 42, the two elongated pads 50, 52 may generally be unable to slide further down the harness straps 46, 48, and towards the seat pan 40. Thus, the upper ends of the harness straps 46, 48 (not visible in FIG. 1) may typically remain covered by the elongated pads 50, 52.

Each of the elongated pads 50, 52 may include upper ends 114, 116 and lower ends 120, 122. The tabs 94, 96 may each be positioned at or slightly above (i.e., about one to five millimeters) one of the upper ends 114, 116 of the elongated pads 50, 52. The tabs 94, 96 may be used to generally prevent the elongated pads 50, 52 from sliding or being pulled down the harness straps 46, 48 along the sides 106, 108 of the pad 90. Specifically, the tab 94 may be positioned relative to the upper end 114 of the elongated pad 50 such that when the pad 90 is installed on the seat 20 (as seen in FIG. 1), a bottom surface 126 of the tab 94 abuts against the inner surface of the seat cover 42 (not illustrated). Thus, the elongated pad 50 may generally be unable to migrate or slide down the harness strap 46 along the side 106 of the pad 90. Likewise, the tab 96 may be positioned relative to the upper end 116 of the elongated pad 52 such that when the pad 90 is installed on the seat 20, a bottom surface 128 of the tab 96 abuts against an inner surface of the seat cover 42. Thus, the elongated pad 52 may generally be unable to migrate or slide down the harness strap 48 along the side 108 of the pad 90.

Figure 4:
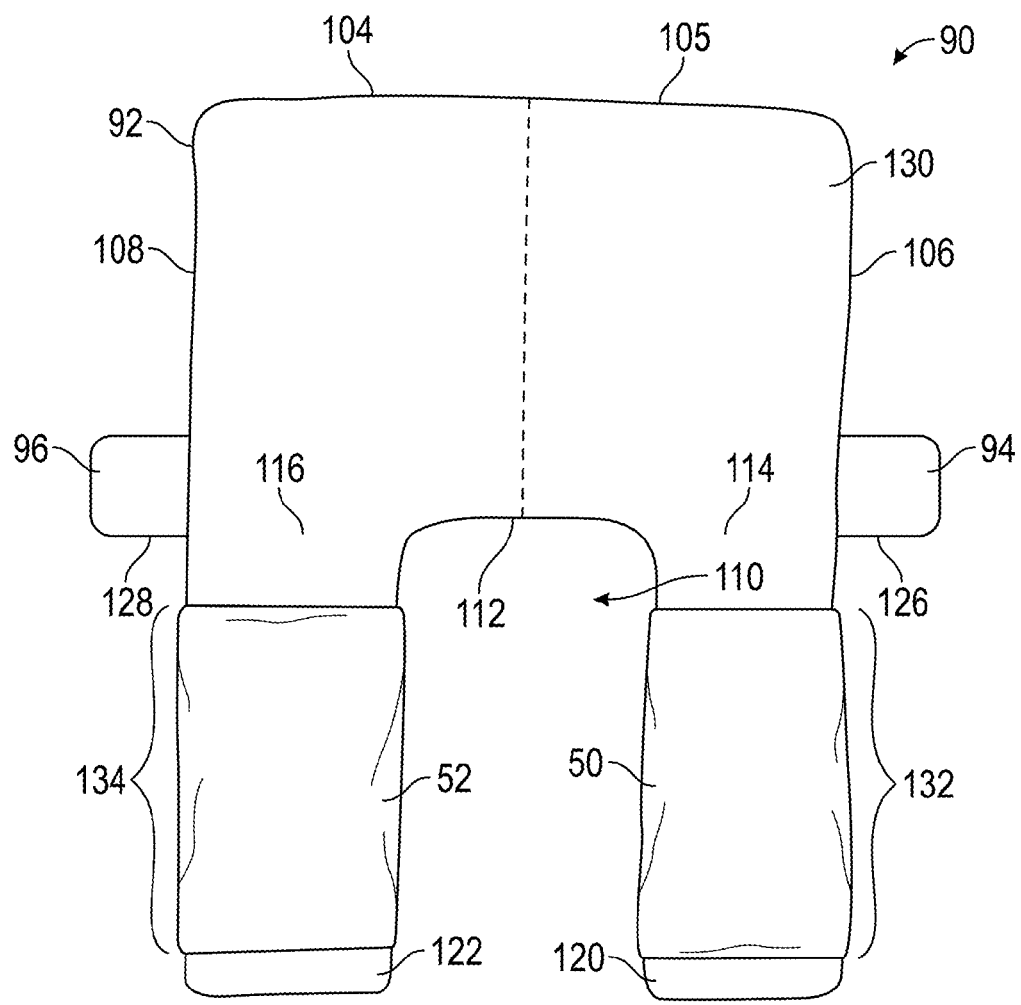
FIG. 4 is a rear detail of the pad shown in FIG. 1.

Referring to FIG. 4, a back side 130 of the pad 90 is illustrated. The two elongated pads 50, 52 may include slotted portions 132, 134 along the back side 130 of the pad 90. The slotted portion 132 may extend between the upper end 114 and the lower end 120 of the elongated pad 50. Referring to both FIGS. 1 and 4, the slotted portion 132 of the elongated pad 50 may be configured to slidingly receive the upper portion of the harness strap 46, where the harness strap 46 may extend in a generally vertical direction through the slotted portion 132. Likewise, the slotted portion 134 may extend between the upper end 116 and the lower end 122 of the elongated pad 52, and may be configured to receive the upper portion of the harness strap 48. Specifically, the harness strap 48 may extend in the generally vertical direction through the slotted portion 134. The slotted portions 132, 134 of the elongated pads 50, 52 may be formed by sewing or otherwise attaching a length of material to each elongated pad 50, 52. In another embodiment, the elongated pads 50, 52 may be tubular members.

Referring to FIGS. 1 and 3-4, the pad 90 may not be attached or connected to any component in the seat 20, other than the elongated pads 50, 52 each receiving one of the harness straps 46, 48. That is, the head portion 92 and the two tabs 94, 96 of the pad 90 may not be attached or connected to the seat 20 or the seat cover 42 in any manner such as, for example, stitching, adhesive, or fasteners. In other words, the pad 90 may be a stand-alone part. Therefore, while the tabs 94, 96 and the abutment surface 112 of the pad 90 generally prevent the elongated pads 50, 52 from sliding down the harness straps 46, 48, the elongated pads 50, 52 may also be urged or pushed into the slits 80, 82 of the seat cover 42. That is, a user may urge the elongated pads 50, 52 in a generally upwards direction towards the head end 42 of the seat 20, and into the slits 80, 82 located in the seat cover 42. Allowing the elongated pads 50, 52 to slide upwards and into the slits 80, 82 of the seat cover 42 may be beneficial to a user when securing a child to the seat 20, which is discussed in greater detail below.

While the pad 90 may be pliable enough to be urged into the slits 80, 82 of the seat cover 42, the pad 90 may still be generally stiff such that the elongated pads 50, 52 may not be completely urged into the slits 80, 82 of the seat cover 42. Moreover, the top surface 105 of the pad 90 may eventually abut against a trim piece located underneath the seat cover 42 (not shown) as the elongated pads 50, 52 are urged into the slits 80, 82 of the seat cover 42, which also generally prevents the elongated pads 50, 52 from being urged completely into the slits 80, 82 of the seat cover 42.

Referring to FIG. 1, the lower portions 74, 76 of the harness straps 46, 48 may each be received by respective openings 140, 142 located along the seat cover 42 at the seat pan 40. An end 144 of the harness strap 46 and an end 146 of the harness strap 48 may both be fixedly attached to the shell 89 of the seat 20 (shown in FIG. 2). The crotch strap 60 may also be received by an opening 150 located along the seat cover 42 at the seat pan 40. An end 152 of the crotch strap 60 may also be fixedly attached to the shell 89 of the seat 20 (shown in FIG. 3). The harness straps 46, 48 may each include respective buckle tongues 154, 156. The buckle tongues 154, 156 may be slidably mounted on one of the harness straps 46, 48. The crotch strap 60 may include a buckle 160 that selectively engages both the buckle tongues 154, 156.

Figure 5:
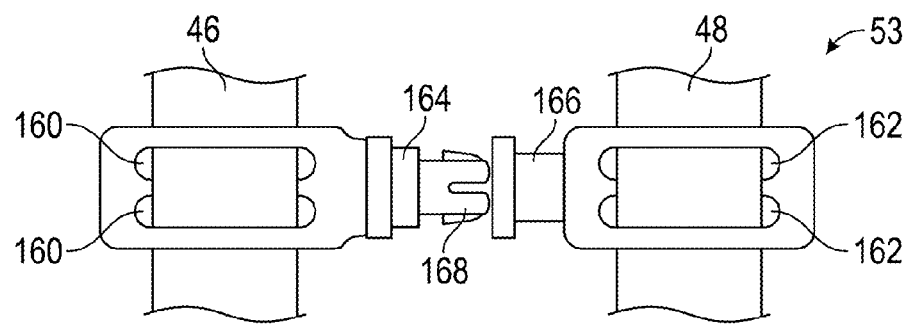
FIG. 5 is a detail of a chest clip shown in FIG. 1.

The chest clip 53 may be slidably mounted on the harness straps 46, 48 by slots 160, 162. FIG. 1 illustrates the chest clip 53 in a secured or locked position, and FIG. 5 illustrates the chest clip 53 in an unlocked position. Referring to FIG. 5, the chest clip 53 may include a male portion 164 slidably mounted on the harness strap 46, and a female portion 166 slidably mounted to the harness strap 48. When the female portion 166 of the chest clip 53 engages a tongue 168 of the male portion 164 of the chest clip 53, the chest clip may be in the locked position (shown in FIG. 1), and the male portion 164 and the female portion 166 of the chest clip 53 may slide together along the harness straps 46, 48. The chest clip 53 may be used to correctly position the harness straps 46, 48 over a child's body when securing the child to the seat 20, which is discussed in greater detail below. It should be noted while the chest clip 53 as discussed includes a male tongue being inserted into a female portion, it is to be understood that the chest clip 53 may include other fastening devices as well.

Securing a child to the seat 20 may now be described. Referring to FIGS. 1 and 5, first a child may be placed in the seat 20. The harness straps 46, 48 may then be placed over the arms and shoulders of the child. The female portion 166 of the chest clip 53 may then engage with the tongue 168 of the male portion 164 of the chest clip 53. The male portion 164 and the female portion 166 of the chest clip 53 may both slide along the harness straps 46, 48, which positions the harness straps 46, 48 over the child's body. In some instances, the chest clip 53 may need to slide upwardly along the upper portions of the harness straps 46, 48 (not visible in FIG. 1) in order to correctly position the harness straps 46, 48 over the child's body. The elongated pads 50, 52 may be urged upwards and into the slits 80, 82 of the seat cover 42, thereby exposing the upper portions of the harness straps 46, 48. Thus, the elongated pads 50, 52 do not typically interfere with a user's ability to position the chest clip 53 over the child's body. Moreover, the pad 90 may be generally stiff enough such that the elongated pads 50, 52 may not be completely urged into the slits 80, 82 of the seat cover 42. Thus, the pad 90 may also generally prevent the user from placing the chest clip 53 at a position too high along the child's body, which is typically at the child's neck. Once the harness straps 46, 48 are positioned over the child's body, the buckle tongues 154, 156 of the harness straps 46, 48 may be engaged with the buckle 160 of the crotch strap 60 to secure the child in the seat 20.

Figure 6:
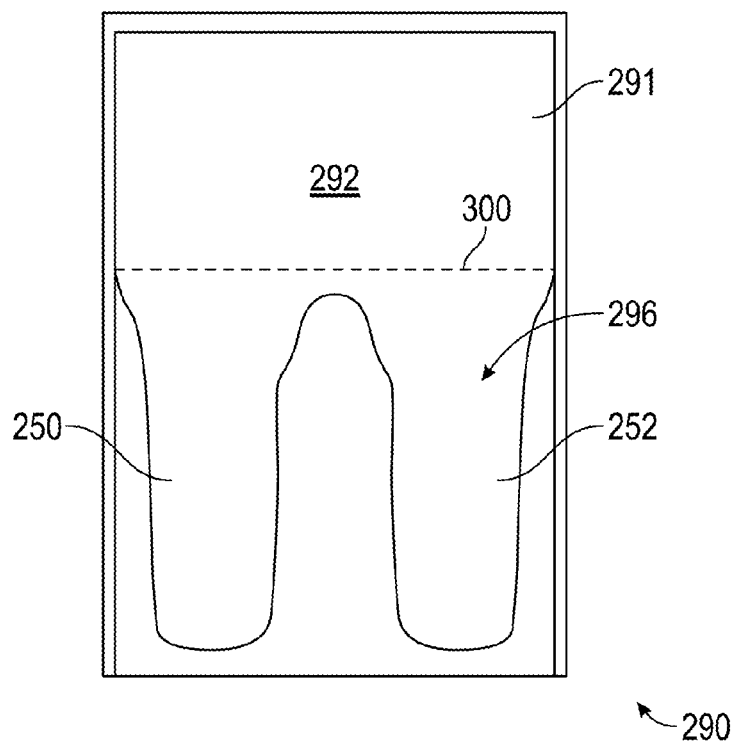
FIG. 6 is a front detail of an alternative embodiment of a pad.
Figure 7:
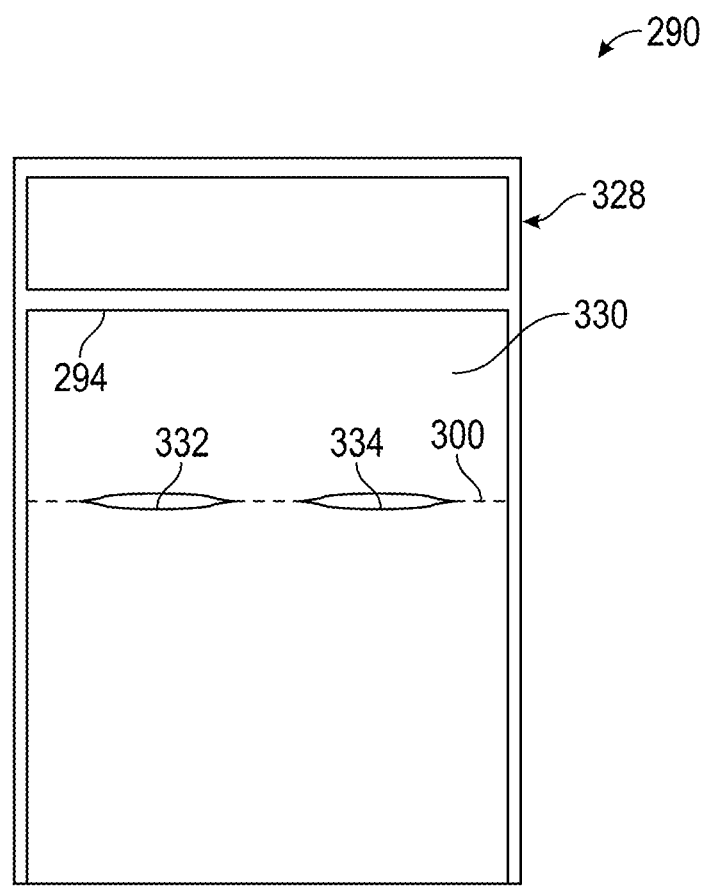
FIG. 7 is a rear detail of the pad shown in FIG. 6.
Figure 8:
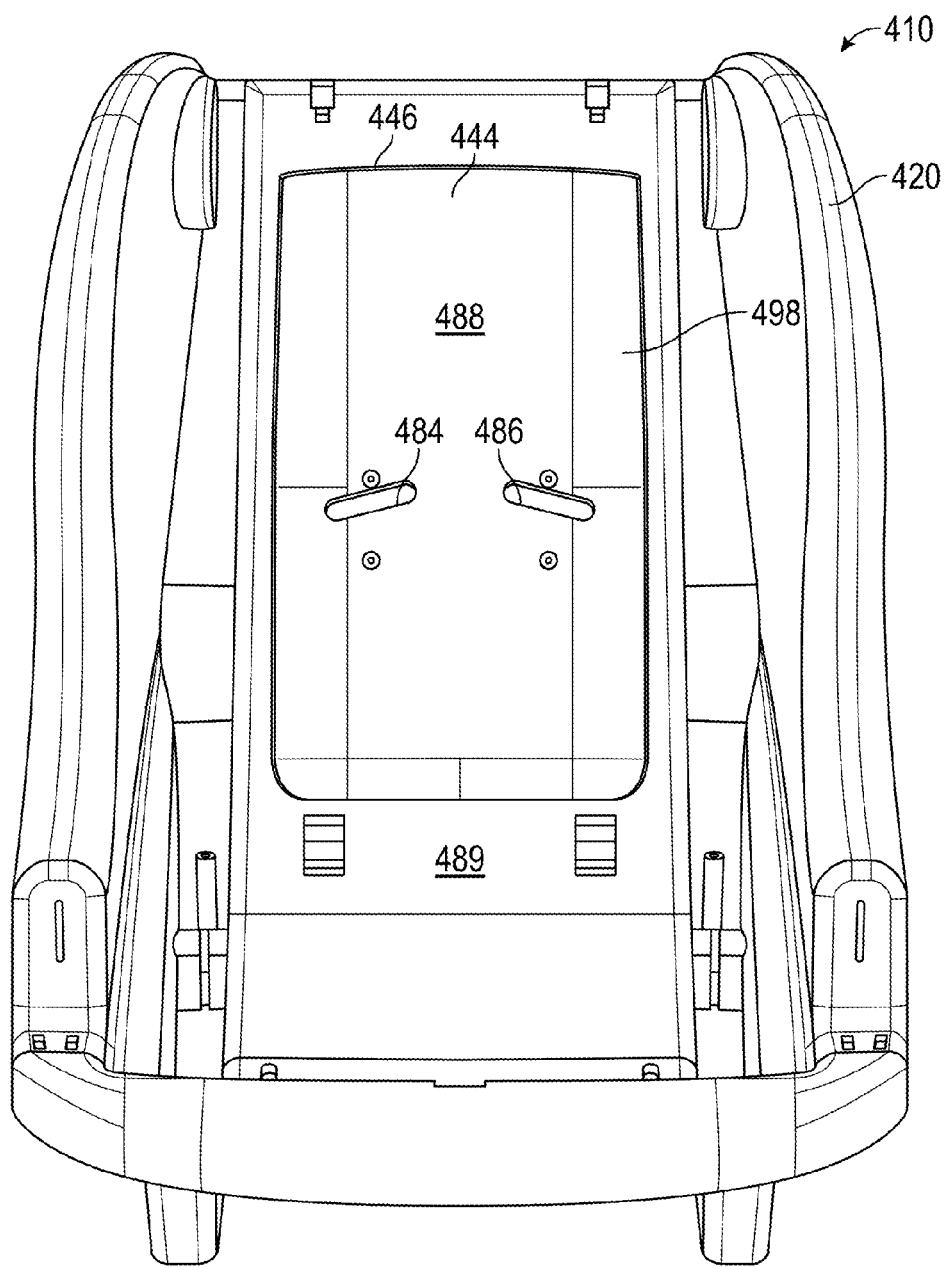
FIG. 8 is a front view of an alternative embodiment of the seat shown in FIG. 1, where the seat cover is removed.

FIGS. 6-7 illustrate an alternative embodiment of a pad 290, and FIG. 8 is an alternative embodiment of the child seat assembly 410. Referring to FIG. 8, the child seat 410 may include a seat 420 having a shell 489 and a headrest 444 having a shell 488. The shell 488 of the headrest 444 may have two openings 484, 486 that correspond to one the slits 80, 82 in the seat cover 42 (shown in FIG. 1). The upper portions of the harness straps 46, 48 (FIG. 1) may also pass through the respective openings 484, 486 located in the headrest 444. As discussed in greater detail below, a portion of the pad 290 may be releasably secured to the shell 488 of the headrest 444.

Referring to FIGS. 6 and 8, a portion 291 of the pad 290 may be located between the inner surface of the seat cover 42 (seen in FIG. 1) and the outer surface of 498 of the shell 488 of the headrest 444. The pad 290 may comprise the two elongated pads 250, 252, a body portion 292, and a back pocket 294 (shown in FIG. 7). Similar to the embodiment as described above and shown in FIGS. 1-4, the two elongated pads 250, 252 may pass through the two slits 80, 82 located in the seat cover 42 (FIG. 1), and may be positioned along an exterior surface 102 of the seat cover 42.

Referring to FIGS. 6-7, the body portion 292 of the pad 290 may not include any compressible material, such as foam or stuffing. However, as seen in FIG. 6, a portion 296 of the pad 290 is sealed off from the body portion 292. For example, in one embodiment, the portion 296 is sealed off from the body portion 292 of the pad 290 by a seam 300. In the non-limiting embodiment as shown, the seam 300 is created by stitching. Unlike the body portion 292, the portion 296 of the pad 290 may be a cushioned part filled with a generally compressible such as, for example, foam or stuffing. In other words, both of the elongated pads 250, 252 may be filled with generally compressible material. Similar to the embodiment as shown in FIGS. 1-4, the harness strap 46 (FIG. 9) may be received by the elongated pad 250, and the harness strap 48 (FIG. 9) may be received by elongated pad 252. The elongated pads 250, 252 may be formed by sewing or otherwise attaching a length of material to each elongated pad 250, 252. In another embodiment, the elongated pads 250, 252 may be tubular members.

Referring to FIG. 7, a back side 330 of the pad 290 is illustrated. The back pocket 294 may be located along an upper portion 328 of the back side 330 of the pad 290. Two slits 332, 334 may be located along the back side 330 of the pad 290. The harness strap 46 (FIG. 1) may pass through the slit 332, and the harness strap 48 (FIG. 1) may pass through the slit 334. In the embodiment as shown in FIG. 7, the slits 332, 334 may be located along the seam 300 of the pad 290.

Figure 9:
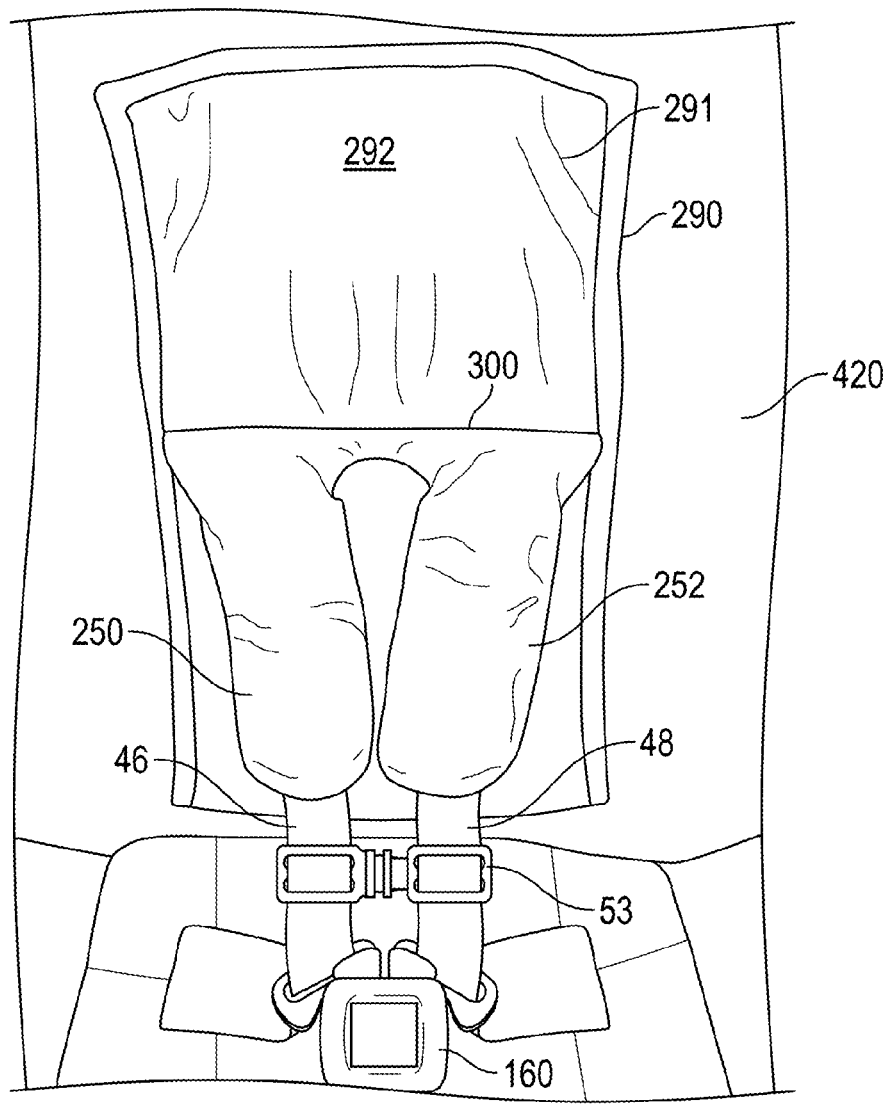
FIG. 9 is an illustration of the pad shown in FIG. 6 releasably engaged to the seat shown in FIG. 8.

The back pocket 294 may be used as a receptacle to position and releasably secure the pad 290 to the shell 488 of the headrest 444 (FIG. 8). FIG. 9 is an illustration of the pad 290 received by a portion of the shell 488 of the headrest 444 (FIG. 8). As seen in FIG. 9, the back pocket 294 of the pad 290 may be hung over an upper end portion 446 of the shell 488 of the headrest 444 (FIG. 8). In other words, the back pocket 294 of the pad 290 may serve as a receptacle which receives the upper end portion 446 of the shell 488 of the headrest 444. By hanging the back pocket 294 of the pad 290 over the upper end portion 446 of the headrest 444, the pad 290 may be secured in place.

Referring to FIGS. 1 and 9, the elongated pads 250, 252 may be urged upwards and into the slits 80, 82 of the seat cover 42, thereby exposing the upper portions of the harness straps 46, 48. Thus, similar to the embodiment as described above and shown in FIGS. 1-4, the elongated pads 250, 252 also do not typically interfere with a user's ability to position the chest clip 53 over the child's body.

Referring generally to the figures, the disclosed pads 90, 290 may be used to substantially prevent the edges of the upper ends of the harness straps from bearing down against a child's skin, and do not generally migrate or slide down the harness straps during use. Moreover, unlike some types of padding currently available for a child seat, the disclosed pads do not typically interfere with a user's ability to position the chest clip 53 (FIG. 1) over a child's body. This is because the elongated pads may be urged upwards and into the slits 80, 82 of the seat cover 42 (FIG. 1), thereby exposing the upper portions of the harness straps 46, 48.

While the forms of apparatus and methods herein described constitute preferred aspects of this invention, it is to be understood that the invention is not limited to these precise forms of apparatus and methods, and the changes may be made therein without departing from the scope of the invention.

What is claimed is:

1. A seat assembly, comprising:
   a shell portion having an outer surface;
   a pair of harness straps having an upper portion;
   a seat cover having an inner surface; and
   a harness pad, comprising:
      a first portion positioned between the outer surface of the shell portion and the inner surface of the seat cover; and
      a pair of elongated pads connected to the first portion, the elongated pads each for slidably receiving the upper portion of a respective one of the harness straps; and
      two tabs located along an outer periphery of the harness pad, wherein one of the tabs is positioned on a side of the harness pad, and the remaining tab is positioned on an opposing side of the harness pad.

2. The seat assembly of claim 1, wherein the elongated pads each include slotted portions for slidingly receiving a portion of one of the harness straps.

3. The seat assembly of claim 1, wherein the seat cover includes a pair of slits, and wherein each harness strap passes through a respective one of the slits in the seat cover.

4. The seat assembly of claim 3, wherein each elongated pad passes through the respective one of the slits in the seat cover.

5. The seat assembly of claim 1, wherein the elongated pads are each filled with a generally compressible material.

6. The seat assembly of claim 1, wherein the harness pad is a stand-alone part that is disconnected from the shell portion and the seat cover.

7. The seat assembly of claim 1, wherein the seat assembly is an infant seat, a convertible seat, or a combination seat.

8. The seat assembly of claim 1, wherein the first portion of the harness pad is a head portion that is positioned along an upper portion of a headrest of the shell, and provides cushioning.

9. The seat assembly of claim 1, further comprising a chest clip that is slidably mounted on the harness straps.

10. A seat assembly, comprising:
    a shell portion having an outer surface;
    a headrest that is part of the shell portion;
    a pair of harness straps having an upper portion;
    a seat cover having an inner surface and a pair of slits, each harness strap passing through a respective one of the slits in the seat cover; and
    a harness pad having a back side, comprising:
       a first portion positioned between the outer surface of the shell portion and the inner surface of the seat cover;
       a back pocket located along the back side of the harness pad, the back pocket receiving a portion of the headrest; and
       a pair of elongated pads connected to the head portion and passing through a respective one of the slits in the seat cover, wherein the elongated pads each include slotted portions for slidingly receiving the upper portion of a respective one of the harness straps.

11. The seat assembly of claim 10, wherein the elongated pads are each filled with a generally compressible material.

12. The seat assembly of claim 10, further comprising a chest clip that is slidably mounted on the harness straps.

13. The seat assembly of claim 10, wherein the seat assembly is an infant seat, a convertible seat, or a combination seat.

14. A seat assembly, comprising:
    a shell portion having an outer surface;
    a pair of harness straps having an upper portion;
    a seat cover having an inner surface; and
    a harness pad having a back side, comprising:
       a first portion positioned between the outer surface of the shell portion and the inner surface of the seat cover;
       a pair of elongated pads connected to the first portion, the elongated pads each slidably receiving the upper portion of a respective one of the harness straps; and
       a back pocket located along the back side of the harness pad.

15. The seat assembly of claim 14, further comprising a headrest that is part of the shell portion, wherein the back pocket receives a portion of the headrest.

* * * * *